United States Patent
Lai

(10) Patent No.: US 8,228,940 B2
(45) Date of Patent: Jul. 24, 2012

(54) VOIP DEVICE AND METHOD OF PREVENTING NOISE GENERATION THEREBY

(75) Inventor: Chin-Ning Lai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 547 days.

(21) Appl. No.: 12/484,991

(22) Filed: Jun. 15, 2009

(65) Prior Publication Data

US 2010/0254371 A1 Oct. 7, 2010

(30) Foreign Application Priority Data

Apr. 2, 2009 (CN) .......................... 2009 1 0301301

(51) Int. Cl.
*H04L 12/66* (2006.01)
(52) U.S. Cl. ........................................ 370/463
(58) Field of Classification Search .................. None
See application file for complete search history.

(56) References Cited

U.S. PATENT DOCUMENTS

| 5,533,099 | A | 7/1996 | Byrne | |
|---|---|---|---|---|
| 6,775,324 | B1* | 8/2004 | Mohan et al. | 375/238 |
| 2007/0280288 | A1* | 12/2007 | Ma | 370/467 |
| 2008/0089356 | A1* | 4/2008 | Hsu et al. | 370/463 |
| 2009/0109969 | A1* | 4/2009 | Cotignola et al. | 370/389 |

* cited by examiner

*Primary Examiner* — Yong Zhou
(74) *Attorney, Agent, or Firm* — Altis Law Group, Inc.

(57) ABSTRACT

A Voice over Internet protocol (VoIP) device includes a time division multiplexing (TDM) bus, a plurality of digital signal processors (DSPs), and a plurality of subscriber line interface circuits (SLICs). The SLICs are respectively connected to a corresponding plurality of telephones. The VoIP device distributes the TDM bus to a plurality of calling timeslots and a special timeslot, and allocates at least one of the calling timeslots to each of the SLICs, selecting one of the DSPs as a special DSP. The VoIP device further directs the special DSP to generate an alternating voltage signal to the special timeslot, and directs the SLICs to receive the alternating voltage signal from the special DSP by the special timeslot to prevent the VoIP device from being locked at a high voltage and from generating noise.

6 Claims, 2 Drawing Sheets

VOIP DEVICE AND METHOD OF PREVENTING NOISE GENERATION THEREBY

BACKGROUND

1. Technical Field

Embodiments of the present disclosure relate to Voice over Internet protocol (VoIP) communication, and more particularly to a VoIP device and a method of preventing noise generation thereby.

2. Description of Corresponding Art

A VoIP device, such as a VoIP gateway, is connected to a plurality of telephones and processes calls by transmitting a plurality of voice communication packets. The VoIP gateway generally includes a plurality of subscriber line interface circuits (SLICs).

Time division multiplexing (TDM) is widely used for the VoIP gateway to process the calls from the telephones. The TDM technology distributes a TDM bus to a plurality of transmission channels, referred to as timeslots, for transmitting the packets according to time. In the network, when lines are disengaged, the TDM bus transmits sequential high voltage signals to the SLICs via the timeslots. As a plurality of the packet transmissions shares one TDM bus, the TDM bus is locked at high voltage and then generates noise when any of the telephone is engaged, which greatly reduces quality of the VoIP communication. Therefore, a heretofore unaddressed need exists for VoIP devices that can overcome the limitations described.

BRIEF DESCRIPTION OF THE DRAWINGS

The details of the disclosure, both as to its structure and operation, can best be understood by referring to the accompanying drawings, in which like reference numbers and designations refer to like elements.

DETAILED DESCRIPTION

All of the processes described may be embodied in, and fully automated via, software code modules executed by one or more general purpose computers or processors. The code modules may be stored in any type of computer-readable medium or other storage device. Some or all of the methods may alternatively be embodied in specialized computer hardware or communication apparatus.

Figure 1:
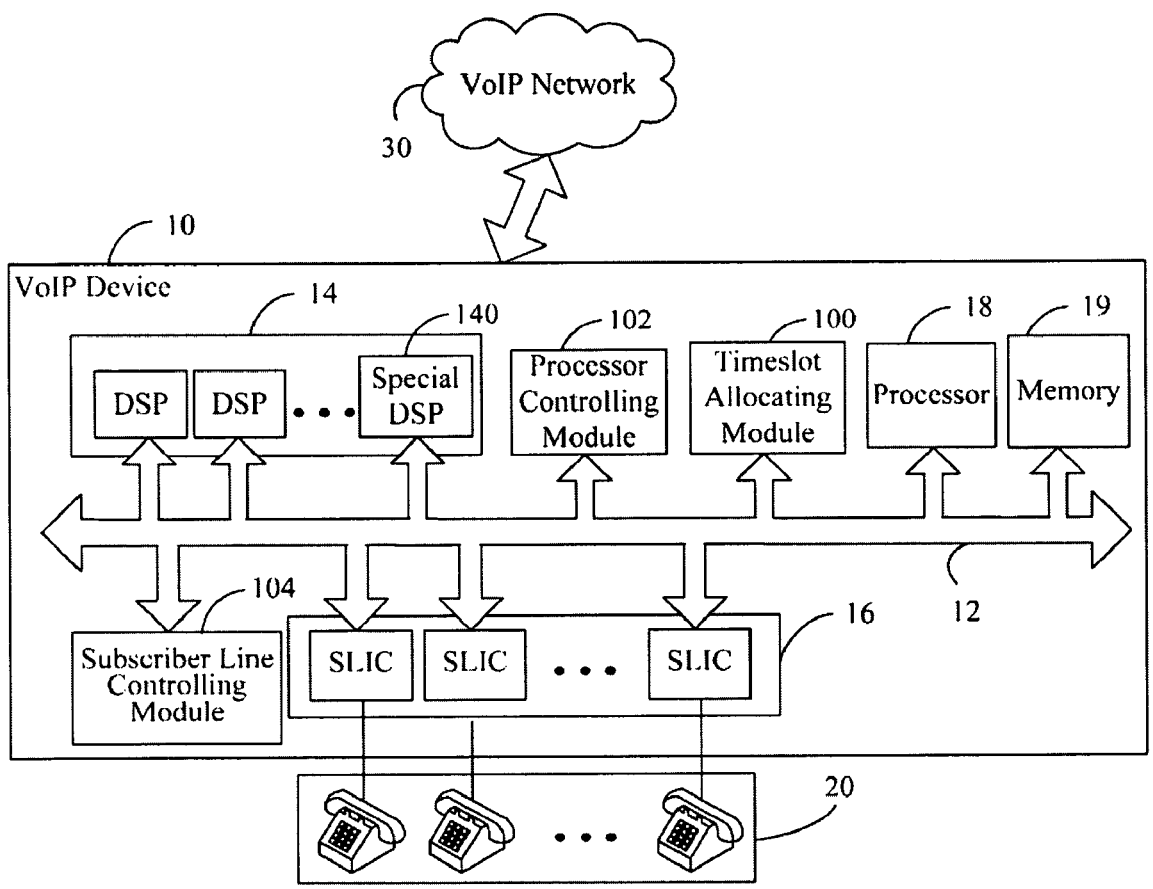
FIG. 1 is a schematic diagram of an application environment and functional modules of one embodiment of a voice over Internet protocol (VoIP) device of the present disclosure.

FIG. 1 is a schematic diagram of an application environment and functional modules of a voice over Internet protocol (VoIP) device 10 of the present disclosure. In one embodiment, the VoIP device 10 is connected between a VoIP network 30 and a plurality of telephones 20 and processes VoIP calls of the telephones 20. The VoIP device 10 converts data packets from the VoIP network 30 to voice signals and then transmits the voice signals to the telephones 20. Meanwhile, the VoIP device 10 converts voice signals from the telephones 20 to data packets and transmits the data packets to the VoIP network 30 so as to process the VoIP calls of the telephones 20. In one embodiment, the VoIP device 10 is an access device of VoIP network, such as a VoIP gateway. The telephone 20 is a VoIP terminal, such as a VoIP telephone. The VoIP network 30 is a network operable to transmit communication data, such as the Internet or an intranet.

The VoIP device 10 includes a time division multiplexing (TDM) bus 12, a plurality of digital signal processors (DSPs) 14, and a plurality of subscriber line interface circuits (SLICs) 16. The SLICs 16 are connected to the telephones 20 one by one. The SLICs 16 are operable to process the calls of the telephones 20, such as detecting whether the telephones 20 are engaged or disengaged, and transmitting ring tones to the telephones 20. In one embodiment, the TDM bus 12 is distributed to a plurality of timeslots. The VoIP device 10 synchronously processes a plurality of the calls via the TDM bus 12. In one embodiment, the TDM bus 12 may be a pulse code modulation (PCM) bus.

In one embodiment, the VoIP device 10 further includes a timeslot allocating module 100, a processor controlling module 102, a subscriber line controlling module 104, a processor 18, and a memory 19. The modules 100-104 may include one or more computerized instructions stored in the memory 19 and executed by the at least one processor 18. The modules 100-104 are operable to prevent noise generation of the VoIP device 10. In one embodiment, the VoIP device 10 generates noise because the TDM bus 12 is locked at a high voltage.

The timeslot allocating module 100 is operable to distribute the TDM bus 12 to a plurality of calling timeslots and a special timeslot, and allocate at least one of the calling timeslots to each of the SLICs 16. In one embodiment, the timeslot allocating module 100 distributes the TDM bus 12 to a plurality of timeslots, selects one free timeslot from the plurality of timeslots as the special timeslot, and then allocates at least one of the calling timeslots to each of the SLICs 16. The free timeslot indicates a timeslot which is not frequently used. In addition to the selected special timeslot, the remaining timeslots are the calling timeslots. The calling timeslots transmit the communication data so as to process the calls when the corresponding telephones 20 start the calls. The special timeslot transmits a special signal for preventing the TDM bus 12 from being locked at high voltage.

The processor controlling module 102 is operable to select one of the DSPs as a special DSP 140 and direct the special DSP 140 to generate an alternating voltage signal to the special timeslot. In one embodiment, the special timeslot is operable to transmit the alternating voltage signal. The special DSP 140 is usually a free DSP which is not used frequently. In one embodiment, the processor controlling module 102 connects an output end of the special DSP 140 to the special timeslot, and directs the special DSP 140 to continuously output the alternating voltage signal to the special timeslot to direct the special DSP 140 to generate the alternating voltage signal to the special timeslot. In one embodiment, the alternating voltage signal indicates a signal with alternated high and low voltage, such as a binary value of 01010101 or 10101010.

The subscriber line controlling module 104 is operable to direct the SLICs 16 to receive the alternating voltage signal from the special DSP 140 by the special timeslot so as to prevent the VoIP device from being locked at a high voltage. In one embodiment, the subscriber line controlling module 104 connects input ends of the SLICs 16 to the special timeslot when the corresponding telephones 20 are disengaged, and then loops the TDM bus to form a loop from the special DSP 140 to the SLICs 16. As such, the SLICs 16 can continuously receive the alternating voltage signal from the special DSP 140 by the special timeslot. The alternating voltage can substantially reduce capacitance effect of the calling timeslots, which reduces interference to the transmission of the communication data and prevents the TDM bus 12 from being locked at high voltage and accordingly prevents noise generation of the VoIP device 10.

The subscriber line controlling module 104 further directs one of the SLICs 16 to process a call by the allocated calling timeslot upon the condition that the SLIC 16 detects that the corresponding telephone 20 starts the call, and directs the SLIC 16 to receive the alternating voltage signal from the special DSP 140 by the special timeslot upon the condition that the SLIC 16 detects that the corresponding telephone finishes the call. In one embodiment, when one of the telephones 20 starts a call, the corresponding SLIC 16 detects an engaged tone and transmits the engaged tone to the subscriber line controlling module 104. The subscriber line controlling module 104 opens the loop of the TDM bus 12 and connects the input end of the SLIC 16 to the corresponding telephone 20 by the allocated calling timeslot so as to direct the SLIC 16 to process the call. When the telephone 20 finishes the call, the corresponding SLIC 16 detects the disengaged tone and transmits the disengaged tone to the subscriber line controlling module 104. The subscriber line controlling module 104 connects the input end of the SLIC 16 to the special timeslot and loops the TDM bus 12. As such, the alternating voltage signal from the special DSP 140 can still transmit to the SLIC 16 by the special timeslot, which prevents the TDM bus 12 from being locked at high voltage.

Figure 2:
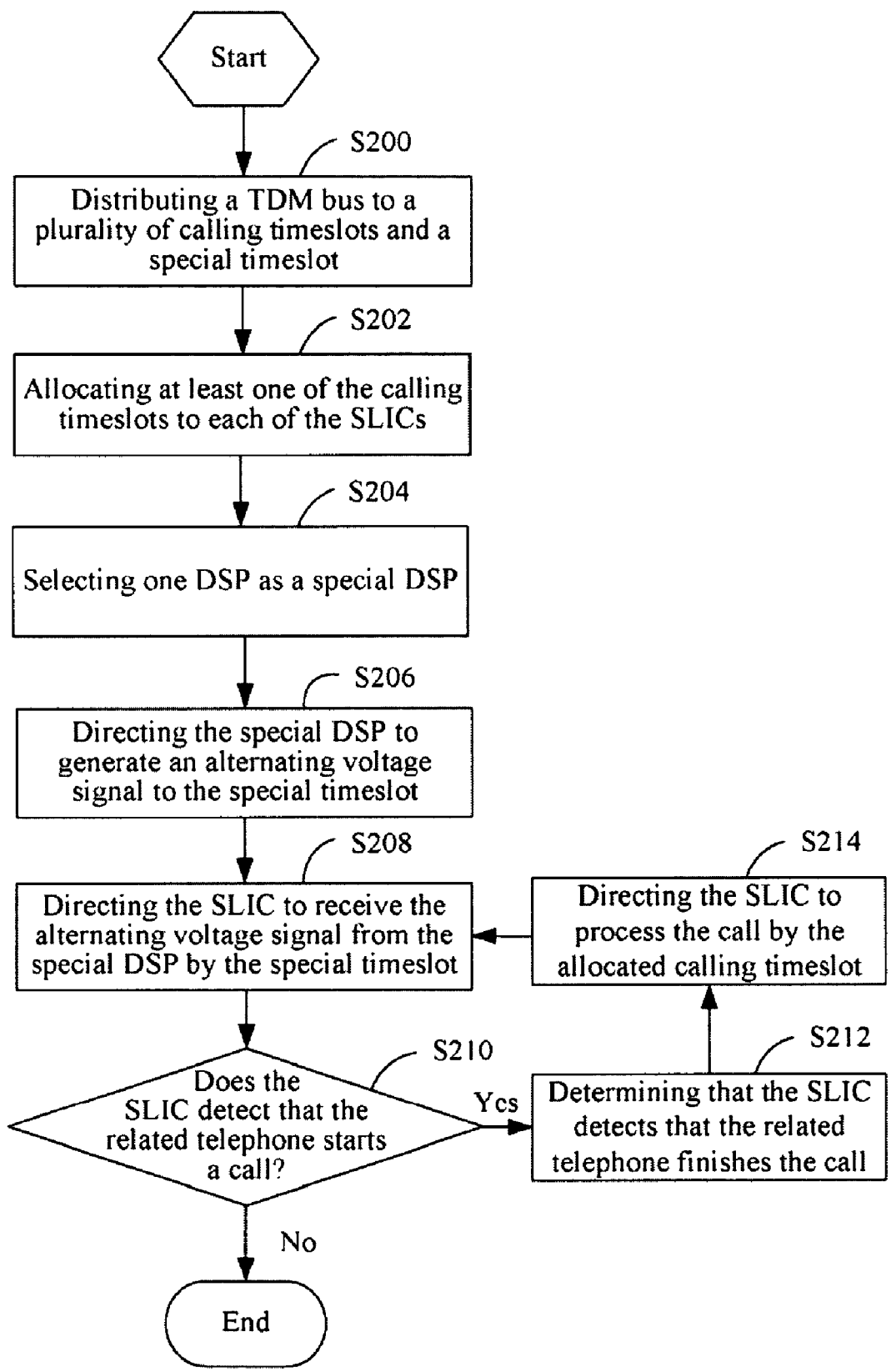
FIG. 2 is a flowchart of one embodiment of a method of preventing noise generation of a VoIP device in accordance with the present disclosure.

FIG. 2 is a flowchart of one embodiment of a method of preventing noise generation of the VoIP device 10 shown in FIG. 1 in accordance with the present disclosure. The method may be embodied in the VoIP device 10, and is executed by functional modules such as those of FIG. 1. Depending on the embodiment, additional blocks may be added, others deleted, and the ordering of the blocks may be changed while remaining well within the scope of the disclosure.

In block S200, the timeslot allocating module 100 distributes the TDM bus 12 to a plurality of calling timeslots and a special timeslot. In one embodiment, the timeslot allocating module 100 distributes the TDM bus 12 to a plurality of timeslots and selects one of the timeslots as the special timeslot. The free timeslot indicates a timeslot not frequently used. In addition to the selected special timeslot, the remaining timeslots are the calling timeslots. The calling timeslots are operable to transmit the communication data so as to process the calls when the corresponding telephones 20 start the calls. The special timeslot is operable to transmit a special signal for preventing the TDM bus 12 from being locked at high voltage.

In block S202, the timeslot allocating module 100 allocates at least one of the calling timeslots to each of the SLICs 16.

In block S204, the processor controlling module 102 selects one of the DSPs as a special DSP 140. In one embodiment, the special DSP 140 is usually a free DSP which is not used frequently.

In block S206, the processor controlling module 102 directs the special DSP 140 to generate an alternating voltage signal to the special timeslot. In one embodiment, the processor controlling module 102 connects an output end of the special DSP 140 to the special timeslot, and then directs the special DSP 140 to continuously output the alternating voltage signal to the special timeslot. As such, the special DSP 140 continuously generates the alternating voltage signal to the special timeslot. As mentioned above, the alternating voltage signal indicates a signal with alternating high and low voltage, such as a binary value of 01010101 or 10101010.

In block S208, the subscriber line controlling module 104 directs the SLICs 16 to receive the alternating voltage signal from the special DSP 140 by the special timeslot so as to prevent the VoIP device from being locked at a high voltage. In one embodiment, the subscriber line controlling module 104 connects input ends of the SLICs 16 to the special timeslot when the corresponding telephones 20 are disengaged, and then loop the TDM bus to form a loop from the special DSP 140 to the SLICs 16. As such, the SLICs 16 can continuously receive the alternating voltage signal from the special DSP 140 by the special timeslot, which prevents the TDM bus 12 from being locked at high voltage and accordingly prevents noise generation of the VoIP device 10.

In block S210, the subscriber line controlling module 104 determines if one of the SLICs 16 detects that the corresponding telephone 20 starts a call. In one embodiment, when one of the telephones 20 starts a call, the corresponding SLIC 16 detects an engaged tone and transmits the engaged tone to the subscriber line controlling module 104.

If one of the SLICs 16 detects that the corresponding telephone 20 starts a call, then in block S212, the subscriber line controlling module 104 directs the SLIC 16 to process the call by the allocated calling timeslot. The subscriber line controlling module 104 opens the loop of the TDM bus 12 and then connects the input end of the SLIC 16 to the corresponding telephone 20 by the allocated calling timeslot to direct the SLIC 16 to process the call.

In block S214, the subscriber line controlling module 104 determines the SLIC 16 detects that the corresponding telephone finishes the call. In one embodiment, when the telephone 20 finishes the call, the corresponding SLIC 16 detects a disengaged tone and transmits the disengaged tone to the subscriber line controlling module 104.

In block S208, the subscriber line controlling module 104 again directs the SLIC 16 to receive the alternating voltage signal from the special DSP 140 by the special timeslot. As such, the alternating voltage signal from the special DSP 140 can again transmit to the SLIC 16 by the special timeslot, which prevents the TDM bus 12 from being locked at high voltage and prevents noise generation of the VoIP device 10.

The VoIP device 10 of the present disclosure continuously transmits the alternating voltage signal to the SLICs upon the condition that the corresponding telephone is disengaged, which prevents the TDM bus 12 from being locked at high voltage and prevents noise generation of the VoIP device 10. Therefore, the TDM bus 12 can transmit the communication data of the engaged telephone without interference, which greatly improves the communication quality of the VoIP network.

While various embodiments and methods of the present disclosure have been described above, it should be understood that they have been presented by way of example only and not by way of limitation. Thus the breadth and scope of the present disclosure should not be limited by the above-described embodiments, but should be defined only in accordance with the following claims and their equivalents.

What is claimed is:

1. A Voice over Internet protocol (VoIP) device, comprising a time division multiplexing (TDM) bus, a plurality of digital signal processors (DSPs), a plurality of subscriber line interface circuits (SLICs), a processor, a memory, and one or more programs, wherein the SLICs are respectively connected to a corresponding plurality of telephones, wherein the one or more programs are stored in the memory and operable to be executed by the processor and operable to prevent noise generation of the VoIP device, the programs comprising:

a timeslot allocating module operable to distribute the TDM bus to a plurality of calling timeslots and a special timeslot, and to allocate at least one of the calling timeslots to each of the SLICs;

a processor controlling module operable to select one of the DSPs as a special DSP and direct the special DSP to generate an alternating voltage signal to the special timeslot, wherein the processor controlling module connects an output end of the special DSP to the special timeslot and directs the special DSP to continuously output the alternating voltage signal to the special timeslot; and a subscriber line controlling module operable to direct the SLICs to receive the alternating voltage signal from the special DSP by use of the special timeslot so as to substantially reduce noise generation of the VoIP device, wherein the subscriber line controlling module connects an input end of the SLIC to the special timeslot and loop the TDM bus to direct the SLIC to receive the alternating voltage signal from the special DSP by the special timeslot upon the condition that the telephone corresponding to the SLIC is disengaged;

wherein the subscriber line controlling module directs one of the SLICs to process a call related to one of the telephones by use of the allocated calling timeslot upon the condition that the one SLIC detects that the corresponding telephone thereto starts the call, and directs the one SLIC to receive the alternating voltage signal from the special DSP by the special timeslot upon the condition that the one SLIC detects that the corresponding telephone finishes the call.

2. The VoIP device as claimed in claim 1, wherein the subscriber line controlling module opens the loop of the TDM bus and connects the input end of the SLIC to the corresponding telephone by the allocated calling timeslot to direct the SLIC to process the call.

3. The VoIP device as claimed in claim 1, wherein the alternating voltage signal is a binary value of 01010101 or 10101010.

4. A method of preventing noise generation of a Voice over Internet protocol (VoIP) device, the VoIP device comprising a time division multiplexing (TDM) bus, a plurality of digital signal processors (DSPs), and a plurality of subscriber line interface circuits (SLICs), wherein the SLICs are respectively connected to a corresponding plurality of telephones, the method comprising:

distributing the TDM bus to a plurality of calling timeslots and a special timeslot;

allocating at least one of the calling timeslots to each of the SLICs;

selecting one of the DSPs as a special DSP;

directing the special DSP to generate an alternating voltage signal to the special timeslot, wherein the directing the special DSP to generate the alternating voltage signal to the special timeslot comprises:

connecting an output end of the special DSP to the special timeslot; and directing the special DSP to continuously output the alternating voltage signal to the special timeslot;

directing the plurality of SLICs to receive the alternating voltage signal from the special DSP by the special timeslot so as to prevent noise generation of the VoIP device;

determining if one of the SLICs detects that the corresponding telephone starts a call;

directing the one SLIC to process the call by the allocated calling timeslot upon the condition that the one SLIC detects that the corresponding telephone starts the call;

determining that the SLIC detects that the corresponding telephone finishes the call; and directing the SLIC to receive the alternating voltage signal from the special DSP by the special timeslot, wherein directing the SLIC to receive the alternating voltage signal from the special DSP by the special timeslot comprises:

connecting an input end of the SLIC to the special timeslot; and looping the TDM bus so as to input the alternating voltage signal to the SLIC.

5. The method as claimed in claim 4, wherein directing the SLIC to process the call by the allocated calling timeslot comprises:

opening the loop of the TDM bus; and connecting the input end of the SLIC to the corresponding telephone by the allocated calling timeslot.

6. The method as claimed in claim 4, wherein the alternating voltage signal is a binary value of 01010101 or 10101010.

* * * * *